James L. Williams, INVENTOR.
BY Donald E. Windle
ATTORNEY.

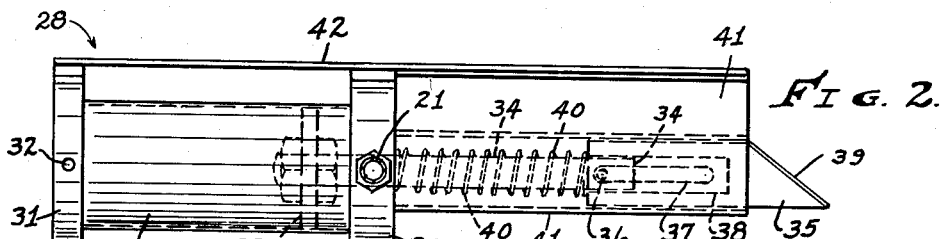
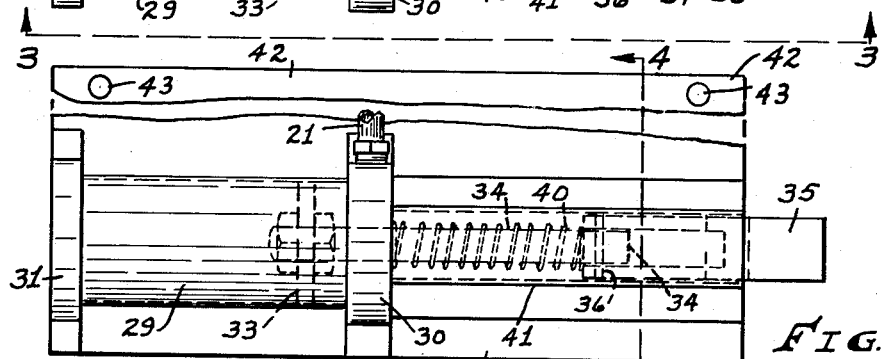
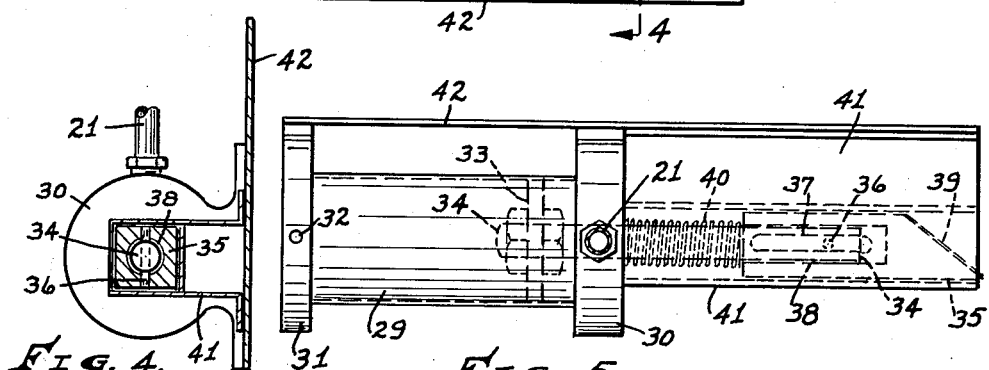
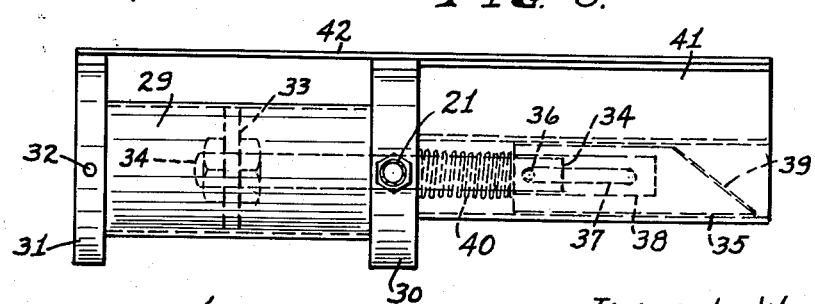

Oct. 17, 1961   J. L. WILLIAMS   3,004,756
EXIT RELEASING SYSTEM FOR PASSENGER-CARRYING VEHICLES
Filed July 1, 1958   4 Sheets-Sheet 4
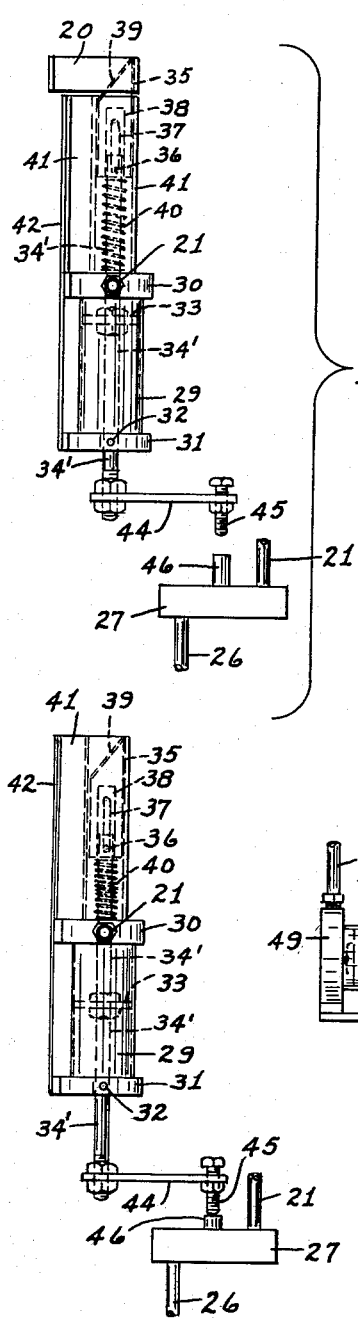
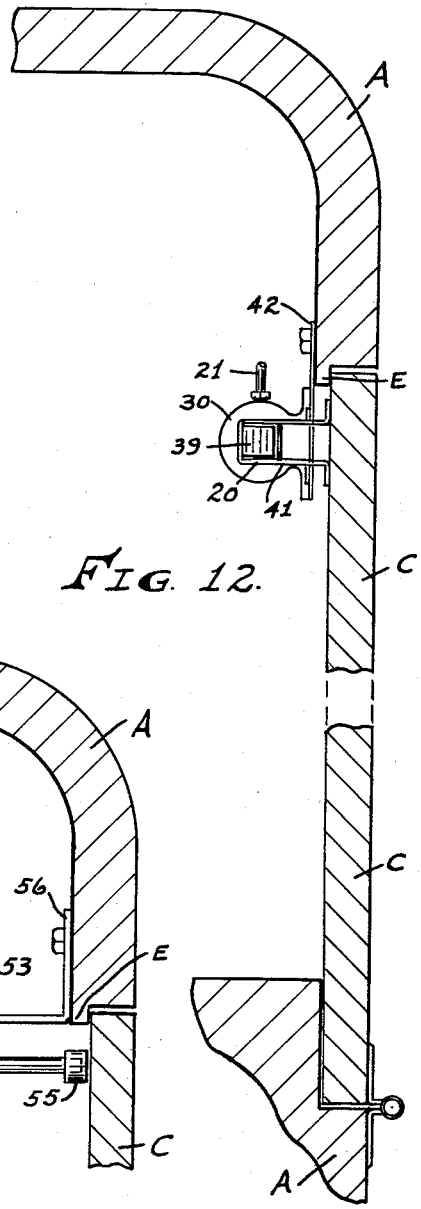
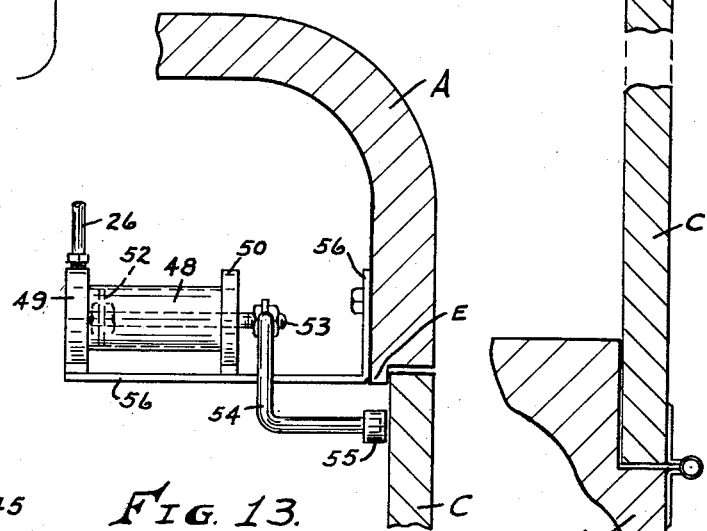
JAMES L. WILLIAMS,
INVENTOR.
BY Donald E. Windle.
ATTORNEY.

United States Patent Office 3,004,756
Patented Oct. 17, 1961

3,004,756
EXIT RELEASING SYSTEM FOR PASSENGER-CARRYING VEHICLES
James L. Williams, R.R. 2, Box 202,
Preble County, Ohio
Filed July 1, 1958, Ser. No. 746,056
1 Claim. (Cl. 268—20)

The present invention relates to the provision of escape means in connection with passenger-carrying vehicles and more particularly in connection with school student transportation buses. In view of the number of fatalities attributed to accidents of school buses in which the passengers were trapped therein, it is timely that a system be provided to permit the passengers to escape therefrom with the least possible resistance in affecting an exit.

The principal object of the invention is the provision of a system which permits easy exit from a passenger-carrying vehicle.

A second object is the provision of a system providing a primary unlatching means for hinged panels and with a secondary means for forcing the hinged panels outwardly to an open position from their normally closed position.

A third object is the provision of a means in and forming a part of the system providing a sequence of operation thereof.

Another object is the provision of a system whereby all exits in a passenger-carrying vehicle are forced open simultaneously.

Further objects and particular advantages of the invention will suggest themselves and become more apparent in the course of the following description, and that which is new will be pointed out in the appended claim.

In order that the invention may be more fully understood and appreciated, I will now take up a detailed description thereof, with reference being had to the accompanying drawings, in which:

FIGURE 2 is a top plan view of one of the unlatching devices.

FIGURE 3 is a side elevation of the unlatching device, taken from line 3—3 of FIGURE 2.

FIGURE 4 is a detail section, taken on line 4—4 of FIGURE 3.

FIGURE 5 is a top plan view of one of the unlatching devices similar to that shown in FIGURE 2, but with the latch bolt thereof being shown in the position occurring in the latching operation.

FIGURE 6 is a top plan view of the unlatching device similar to that shown in FIGURES 2 and 5, but with the latching bolt thereof being shown in retracted position as occurs through the operational system.

FIGURE 10 is a top plan view of one of the unlatching devices, but with the same having an air valve actuating arm secured thereto and operated thereby.

FIGURE 11 is a top plan view similar to that shown in FIGURE 10, but with the air valve actuating arm being shown in operative position with relation to the air valve.

FIGURE 12 is a detail vertical section through a vehicle body and the closure member thereof, and showing the closure member in latched condition.

FIGURE 13 is a partial vertical section similar to that shown in FIGURE 12, but showing the pusher or panel-operating device and with the same being shown in its normally retracted position.

Like characters of reference designate like parts throughout the several views of the drawings.

Figure 1:
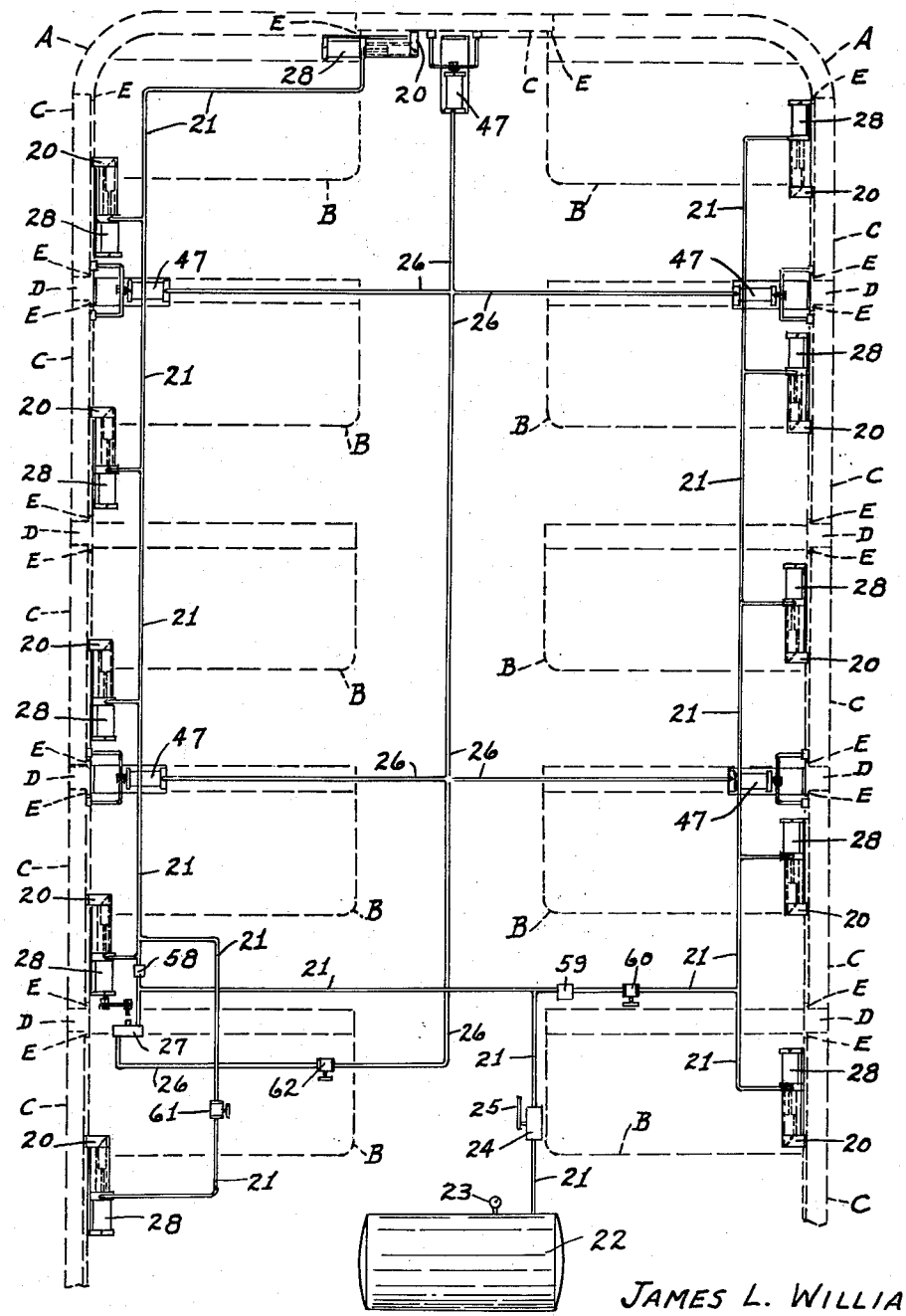
FIGURE 1 is a diagrammatical plan view of an exit release system embodying the features and the principles of the invention.

In order that the invention, its operation, and uses may be more fully and comprehensively understood and appreciated, I will now take up a detailed description thereof in which the same will be more fully set forth, with reference thereto being had to the accompanying drawings forming a part hereof.

Referring now to the drawings in detail, letters A designate the vehicle body, with the same being provided with a plurality of seats B, and with each of the seats being shown as being located adjacent a bottom-hinged panel C. Mullions D are provided between the panels and providing openings in the side of the vehicle. Stops E are provided against which the panels C are adapted to close.

The upper end of each of the panels C is provided with a latch keeper member 20 which is positioned below the upper edge of the panel sufficiently to clear the stop E at the head of the opening.

I have provided latching means at each of the panels, as shown in FIGURE 1. The latching means are pneumatically operated, air pressure supplied thereto through a primary conduit system 21 which is connected to air storage tank 22 having a gage 23. The primary conduit system has a master valve 24 therein with the same being located near tank 22 with lever 25 being provided for opening and closing the valve. A cord or cords (not shown) may be secured in operative condition to lever 25, with the cord or cords being located within reach of the operator and/or passengers of the vehicle.

The pusher or panel-actuating means are served with a second air line 26 which is connected to primary air line 21 through a secondary plunger-operated valve 27.

Each of the latching means is designated generally by a numeral 28 in FIGURE 1, and with further parts thereof being shown in FIGURES 2, 3, 4, 5, 6 and 12. Each of the general latching mechanisms is composed of an air cylinder 29 having an end 30 and an end 31, with air line 21 being connected into end member 30. End member 31 has a relief aperture 32 formed therein for the escape of normal air in the cylinder as the piston 33 is actuated by air pressure entering the cylinder through the line 21 and end member 30. Piston rod 34 is secured to piston 33 and extends outwardly through end 30, with the outer end thereof being movably secured into latch bolt 35 by means of pin 36 which is adapted to operate in elongated slot 37 of the latch bolt 35. Latch bolt 35 has a bore 38 formed longitudinally and partially therethrough into which the end of piston rod 34 can operate. A beveled face 39 is provided on the outer end of the latch bolt for sliding engagement with a respective latch keeper 20. A compression spring 40 is positioned on the piston rod 34 with one end thereof bearing against end member 30 and with the other end bearing against the inner end of latch bolt 35, with the normal action of the spring providing means causing the beveled end portion 39 of the latch bolt 35 to project out of housing 41 to the position shown in FIGURES 2 and 3. The assembly of the latching means is secured to and carried by mounting plate 42 which has apertures 43 formed through the normally vertical leg thereof for securing the assembly to the body A by means of screws or bolts.

Referring to FIGURES 2, 3 and 6, it will be noted that air pressure introduced into the cylinder 29 through line 21 causes the piston 33 to move from the position shown in FIGURES 2 and 3 to the position shown in FIGURE 6, withdrawing the latch bolt 35 out of engagement with the latch keeper 20, and with the compression spring 40 providing a cushioning effect when the piston 33 has reached its limit away from end 30.

Spring 40 further provides means permitting latch bolt 35 to be pushed into its housing 41 by the action of the latch keeper 20 in the closing movement of the respective panel C, with the latch bolt assuming the position shown in FIGURE 5 as the latch keeper passes the end of the latch bolt. In coming into latching position, the latch keeper rides against the beveled surface 39 of the latch bolt. After the latch keeper has passed the latch bolt, spring 40 forces latch bolt 35 outwardly into engagement with the latch keeper.

One of the assemblies 28 is modified slightly by extending the piston rod through the end member 31, with the rearward portion of the piston rod being designated by numerals 34' in FIGURES 10 and 11. Portion 34' has an arm 44 secured thereon and extending laterally therefrom with there being a plunger-actuating screw 45 adjustably secured through the outer end thereof. Screw 45 is adapted to contact and push against plunger 46 of the plunger-operated valve 27 as the piston 33 retracts the latch bolt 35 from the latch keeper 20, and with the plunger 46 opening valve 27 to permit air to flow from line 21 into line 26.

Figure 7:
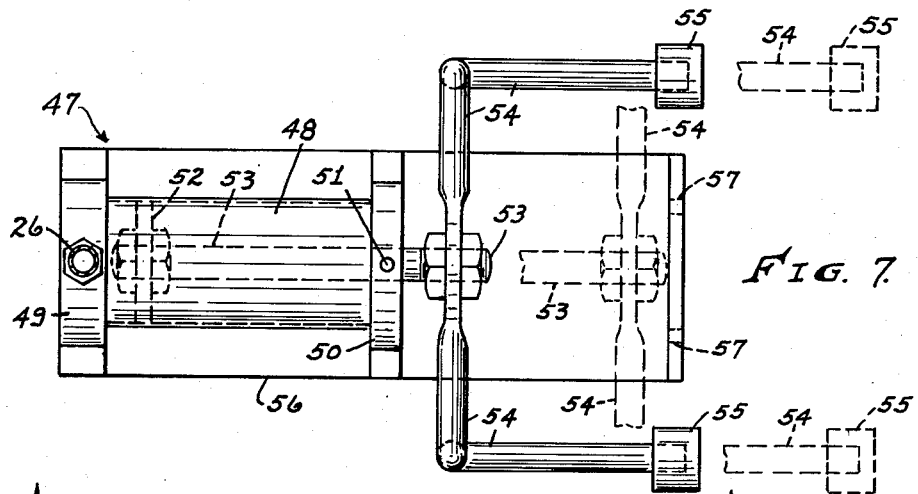
FIGURE 7 is a top plan view of one of the pushers or panel-actuating devices.
Figure 8:
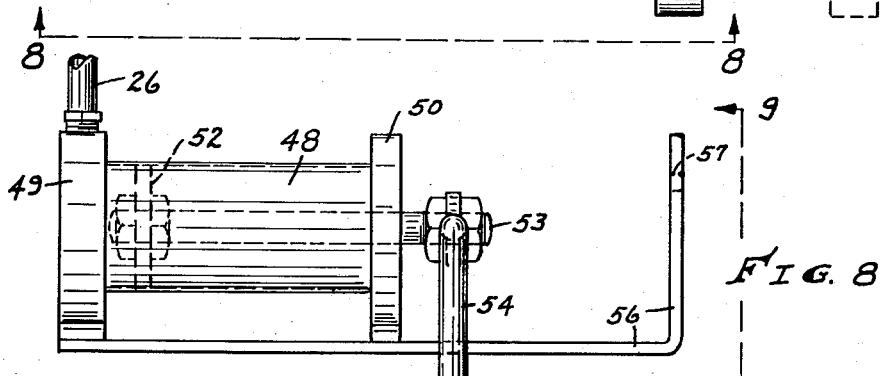
FIGURE 8 is a side elevational detail of one of the pusher or panel-actuating devices, taken from line 8—8 of FIGURE 7.
Figure 9:
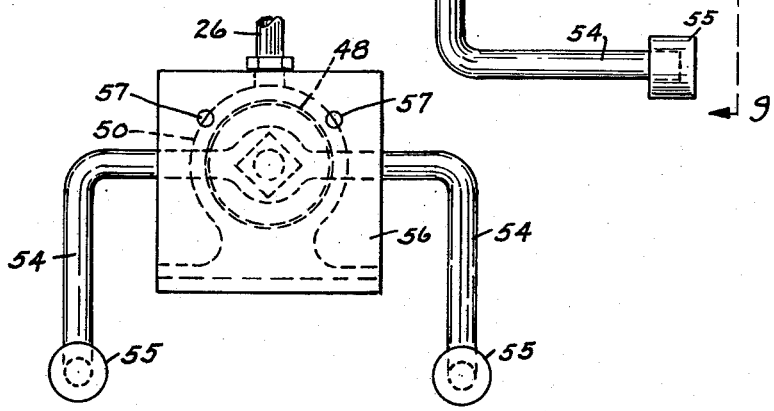
FIGURE 9 is an end elevation of the device shown in FIGURE 8, taken from line 9—9 of FIGURE 8.

Each of the pusher or panel-actuating devices is designated generally by a numeral 47 in FIGURE 1, and with further parts thereof being shown in FIGURES 7, 8, 9 and 13. Each of the general pushers or panel-actuating devices is composed of an air cylinder 48 having ends 49 and 50 secured thereon. Air line 26 is secured into the end member 49, as shown in FIGURES 7 and 8. End 50 is provided with a relief aperture 51 to permit the escape of normal air from the cylinder when piston 52 is operated by air pressure from line 26. Piston rod 53 is secured into piston 52, with the same extending outwardly through end member 50, as shown in FIGURES 7 and 8. A pusher arm member 54 is secured on and carried by the outer end of piston rod 53, and with bumper members 55 being secured on the ends of the arm member 54. The members 53, 54 and 55 are shown in FIGURE 7 by broken lines in extended position. A mounting plate 56 carries the pusher assembly and is adapted to have its vertical leg secured to the vehicle body through apertures 57.

Referring to FIGURES 7, 8 and 13, it will be noted that air pressure introduced into cylinder 48 through line 26 will force the piston 52 from its location adjacent end 49 toward end member 50, and with the piston rod 53 carrying the pusher arm 54 and bumpers 55 from the position shown in full lines in FIGURE 7 to the position shown in broken lines in the same figure. Referring to FIGURE 13, the pusher assembly is shown in normal position with relation to the panel C.

Line 21 has a check valve 58 therein with the valve being located along one side of the vehicle between the first of the assemblies 28 and the plunger-operated valve 27. A second check valve 59 is positioned in line 21 leading to the opposite side of the vehicle. The check valves are provided to prevent loss of pressure to the units 28 when plunger 46 of valve 27 is depressed by the action of piston rod 34' through arm 44 and screw 45.

I have further provided pressure release valves 60 and 61 in line 21 and pressure release valve 62 in line 26. The pressure release valves are provided to release the the pressure from the lines 21 and 26 should the panels C be in released position and are brought to their normal and latched position. Before the pressure release valves are opened, it is necessary to close master valve 24. After the release of the air pressure in lines 21 and 26, the latch bolts 35 are brought to their normal positions by the action of springs 40, as shown in FIGURES 2 and 3. Also, as the panels C assume their normally closed positions, the pushers are returned to their normal positions by pressure thereagainst by the closing motion of the panels.

*Operation*

With all of the panels in closed and latched condition, the same may be opened by moving lever 25 to open the master valve 24 permitting air from storage tank 22 to be distributed, through line 21 to the latching devices which, being actuated by the air pressure, retracts the latch bolts from their respective latch keepers 20. As the pistons in the latching members are forced toward ends 31, screw 45 is forced against plunger 46 of the valve 27, permitting the air to flow through valve 27 into line 26 where the same is distributed to the various pusher assemblies. Should any of the panels C remain in closed condition after the unlatching operation, the same are pushed from their closed positions by the pushers.

In order to again close and latch the panels, valve 24 is closed by means of lever 25, after which pressure in line 21 is released from cylinders 29 by opening release valves 60 and 61, and by releasing the pressure in line 26 by opening release valve 62. The release of pressure from line 21 permits the latch bolts 35 to engage the latch keepers 20, and the release of pressure from line 26 permits the retraction of the pushers upon contact therewith by the respective panels C moving to their latched positions.

From the above, it is obvious that the bottom-hinged panels C can be simultaneously unlatched and pushed open by the opening of master valve 24 and which permits rapid exit of the passengers from the vehicle.

I desire that it be understood that I am not to be limited to the specific form and arrangement of the parts herein shown and described, but that minor changes may be made therein, insofar as the changes may fall within the scope of the appended claim.

Having now shown and described the invention, what I claim, and desire to secure by Letters Patent of the United States, is:

In a passenger-carrying vehicle having bottom-hinged closures, a system of closure latching and unlatching means, a system of closure pusher members, a primary air line system extending from an air storage tank to the latching and unlatching means, a secondary air line system extending from the primary air line system through a plunger-operated valve positioned between and connected with each of the air line systems, with the secondary air line being extended to each of the closure pusher members, with the plunger-operated valve being operated by an arm secured on and carried by one of the latching and unlatching means after the unlatching operation has been completed, and with the pushing operation occurring in sequence after the unlatching operation.

References Cited in the file of this patent

UNITED STATES PATENTS

| | | |
|---|---|---|
| 1,076,051 | Morgan | Oct. 21, 1913 |
| 1,431,986 | Simmon | Oct. 17, 1922 |
| 1,519,121 | Down et al. | Dec. 16, 1924 |
| 1,528,090 | Tracy | Mar. 3, 1925 |
| 1,555,174 | Williams | Sept. 29, 1925 |
| 1,864,468 | Pieper | June 21, 1932 |
| 1,909,377 | Neveu | May 16, 1933 |
| 2,697,003 | Arroyo | Dec. 14, 1954 |
| 2,726,893 | Zucker | Dec. 13, 1955 |
| 2,781,870 | Clements | Feb. 19, 1957 |